(12) United States Patent
Haas et al.

(10) Patent No.: US 11,480,845 B2
(45) Date of Patent: Oct. 25, 2022

(54) MICROWAVE PHOTONIC LINKS AND METHODS OF FORMING THE SAME

(71) Applicant: GOVERNMENT OF THE UNITED STATES OF AMERICA, AS REPRESENTED BY THE SECRETARY OF THE NAVY, Arlington, VA (US)

(72) Inventors: Bryan Haas, Arnold, MD (US); Jason McKinney, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/411,875

(22) Filed: May 14, 2019

(65) Prior Publication Data

US 2019/0346735 A1 Nov. 14, 2019

Related U.S. Application Data

(60) Provisional application No. 62/671,200, filed on May 14, 2018.

(51) Int. Cl.
| | | |
|---|---|---|
| *H04B 10/64* | (2013.01) | |
| *G02F 1/225* | (2006.01) | |
| *G02F 1/21* | (2006.01) | |

(52) U.S. Cl.
CPC ........... *G02F 1/2255* (2013.01); *H04B 10/64* (2013.01); *G02F 1/212* (2021.01); *G02F 2202/20* (2013.01)

(58) Field of Classification Search
CPC .......... G02B 12/57; G02B 6/243; G02B 6/00
USPC .............................................................. 385/3
See application file for complete search history.

(56) References Cited

U.S. PATENT DOCUMENTS

| | | | | |
|---|---|---|---|---|
| 5,381,147 A | * | 1/1995 | Birkmayer | ................ G02F 7/00 341/137 |
| 5,422,966 A | * | 6/1995 | Gopalakrishnan | ...... G02F 1/225 385/2 |
| 5,644,664 A | * | 7/1997 | Burns | ..................... G02F 1/225 385/2 |
| 5,799,116 A | * | 8/1998 | Yamamoto | ........... H04B 10/114 385/12 |

(Continued)

*Primary Examiner* — Kaveh C Kianni
(74) *Attorney, Agent, or Firm* — US Naval Research Laboratory

(57) ABSTRACT

Methods and apparatuses for downconverting are provided. A dual-drive mach zehnder modulator (DDMZM) receives: a continuous wavelength optical signal, an input signal (microwave signal), and local oscillator tones. The DDMZM includes: first and second arms formed from optical waveguides which receive the optical signal, a first modulator that receives the input signal, and a second modulator that receives the oscillator tones. The input signal is modulated onto the optical signal propagating through the first arm to form a first modulated optical signal. The oscillator tones and third-order intermodulation products of those tones are modulated onto the optical signal propagating through the second arm to form a second modulated optical signal. The modulated optical signals are combined to form an output optical signal. The oscillator tones are spaced two folded bandwidths apart and centered within a spectrum of interest of the input signal.

18 Claims, 4 Drawing Sheets

(56) References Cited

U.S. PATENT DOCUMENTS

| | | | | |
|---|---|---|---|---|
| 5,920,414 | A * | 7/1999 | Miyachi | H04B 10/506 398/14 |
| 5,977,911 | A * | 11/1999 | Green | H01Q 3/22 342/157 |
| 6,674,969 | B1 * | 1/2004 | Ogusu | H04B 10/25758 398/79 |
| 6,724,523 | B2 * | 4/2004 | Yap | H01Q 3/2676 330/3 |
| 7,076,168 | B1 * | 7/2006 | Shattil | H04B 10/25752 398/202 |
| 9,444,502 | B2 * | 9/2016 | Kpodzo | H04B 1/10 |
| 2003/0002121 | A1 * | 1/2003 | Miyamoto | H04B 10/5561 398/185 |
| 2005/0023434 | A1 * | 2/2005 | Yacoubian | G01N 29/30 250/200 |
| 2005/0156778 | A1 * | 7/2005 | Yap | G01S 7/28 342/54 |
| 2006/0215175 | A1 * | 9/2006 | Yacoubian | G01N 21/9505 356/502 |
| 2007/0164842 | A1 * | 7/2007 | Koenig | G02F 1/225 333/219.2 |
| 2009/0040579 | A1 * | 2/2009 | Mickelson | G02F 1/355 359/15 |
| 2010/0014874 | A1 * | 1/2010 | Kawanishi | H04B 10/5563 398/187 |
| 2013/0236187 | A1 * | 9/2013 | Middleton | H04B 10/00 398/116 |
| 2013/0315597 | A1 * | 11/2013 | Shaver | H04J 14/0227 398/79 |
| 2014/0300695 | A1 * | 10/2014 | Smalley | G03H 1/02 348/40 |
| 2017/0244165 | A1 * | 8/2017 | Ghelfi | H01Q 3/2676 |
| 2017/0310006 | A1 * | 10/2017 | Vidal Drummond | H01Q 3/2676 |
| 2018/0145766 | A1 * | 5/2018 | Rohde | H04B 10/64 |
| 2018/0259825 | A1 * | 9/2018 | DeSalvo | G02F 1/21 |
| 2018/0309515 | A1 * | 10/2018 | Murakowski | H04B 10/69 |
| 2019/0305849 | A1 * | 10/2019 | Murakowski | H04B 10/69 |

* cited by examiner

MICROWAVE PHOTONIC LINKS AND METHODS OF FORMING THE SAME

BACKGROUND

Field of the Invention

The present application relates generally to microwave photonic links and methods for forming the same.

Description of Related Art

There are at least two components in a communications system: a source and a receiver. A receiver is designed to receive analog signals within a certain frequency range and turn those analog signals into digital signals. Modern receivers can receive and process signals with a frequency range that is hundreds of megahertz (MHz) wide, but to date they cannot receive and process gigahertz (GHz) signals which are used in some forms of communications and other applications (e.g., RADAR). This is due to the nature of converting an analog signal to a digital signal. To convert an analog signal into a digital signal, the analog signal must be sampled. Sampling is where the value of the analog signal is recorded at discrete instances of time. The result of a sampling operation is a digital version of the analog signal. It may be possible to reconstruct the analog signal from the digital signal if the sampling rate was greater than the Nyquist frequency, which is twice the highest frequency present in the analog signal. For gigahertz signals, this requires a very high sampling rate which is a significant barrier. One way to overcome this barrier is to downconvert the analog signal. Downconversion, in general, means to lower the frequency of a signal without altering the information it carries. FIG. 1A illustrates the concept of downconversion. FIG. 1A is a frequency domain representation of a signal block 102 representing an analog signal that spans some bandwidth in relation to a local oscillator (LO) 104. The local oscillator 104 is a continuous signal of a particular known frequency, as represented by the vertical line. Subtracting the signal block 102 from the local oscillator 104 results in a new signal block 106 which contains the same information as signal block 102, but is at a lower frequency. If there are multiple signal blocks at high frequency ranges, those blocks may be translated to a lower frequency range by a technique called bandwidth compression, which is also called folding. FIG. 1B is illustrative. FIG. 1B shows a frequency comb 110 with four discrete frequency lines 110A, 110B, 110C, and 110D that is used to shift information in frequency bands 112A, 112B, 112C, and 112D to a lower frequency range 114, respectively. However, current implementations of these approaches have significant drawbacks.

With current downconversion techniques, remodulation may occur resulting signal quality issues, specifically spurs and phasing. In addition, keeping the lower frequency range (called the intermediate frequency) clear of noise becomes a challenge if more than one local oscillator is used. Current folding techniques use frequency combs with frequency lines that are separated by several GHz. But using combs with frequency lines spaced so far apart means that the intermediate frequency range is still not compact enough to fit within the operable frequency range of current digitizers. For example, in order to have a 500 MHz folded bandwidth, comb lines needs to be 1 GHz apart for continuous coverage of the original spectrum of interest. This means the resulting intermediate frequency blocks will still need to be digitized separately, and even if each of these blocks is small enough, there are too many extraneous pieces of spectrum which are also converted that interfere and add more noise that covers the bandwidth to be specifically digitized. Thus, it would be desirable to have a system that could downconvert and digitize a high-frequency radio spectrum band without these disadvantages.

SUMMARY OF THE INVENTION

One or more the above limitations may be diminished by structures and methods described herein.

In one embodiment, an apparatus for downconverting a high frequency band to a lower frequency band is provided. The apparatus includes an optical source and a dual-drive mach zehnder modulator. The optical source is constructed to output a continuous wavelength optical signal. The dual-drive mach zehnder modulator includes: a first arm formed from a first optical waveguide, a second arm formed from a second optical waveguide, a first modulator constructed to receive an input signal from a first source and modulate the input signal onto the optical signal propagating through the first arm to form a first modulated optical signal, and a second modulator constructed to receive a plurality of local oscillator tones from a local oscillator source and modulate the plurality of local oscillator tones onto the optical signal propagating through the second arm to form a second modulated optical signal. The second modulator is further constructed to modulate third-order intermodulation products of the plurality of local oscillator tones onto the optical signal propagating through the second arm. The dual-drive mach zehnder modulator is constructed to output an output signal which is a combination of the first modulated optical signal and the second modulate optical signal.

In another embodiment, a method of downconverting a high frequency band to a low frequency band is provided. At a dual-drive mach zehnder modulator, a continuous wavelength optical signal from an optical source, an input signal from a first source, and a plurality of local oscillator tones from a local oscillator source are received. The dual-drive mach zehnder modulator includes: a first arm formed from a first optical waveguide and constructed to receive the optical signal, a second arm formed from a second optical waveguide and constructed to receive the optical signal, a first modulator constructed to receive the input signal from the first source, and a second modulator constructed to receive the plurality of local oscillator tones. The input signal is modulated onto the optical signal propagating through the first arm to form a first modulated optical signal. The plurality of local oscillator tones and third-order intermodulation products of the plurality of local oscillator tones are modulated onto the optical signal propagating through the second arm to form a second modulated optical signal. The first modulated optical signal and the second modulated optical signal are combined to form an output optical signal. The input signal from the first source is a microwave signal that includes a spectrum of interest, and the plurality of local oscillator tones are spaced two folded bandwidths apart and centered within the spectrum of interest. The folded bandwidth is a bandwidth of digitizer constructed to receive an electrical signal generated from the output signal.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1A:
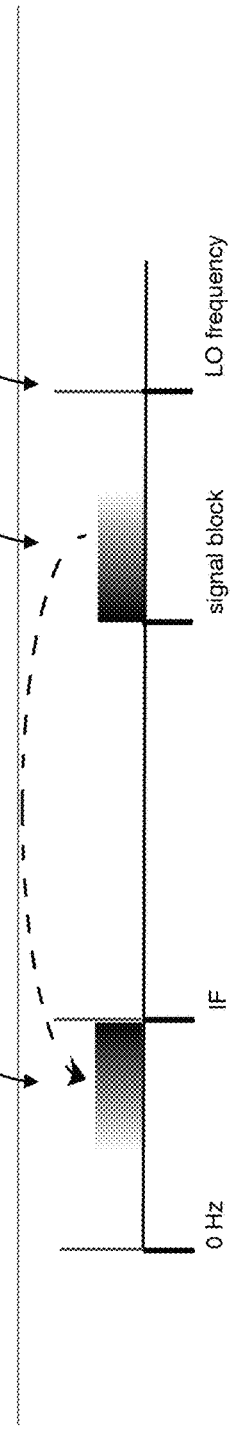
FIG. 1A is a generic illustration of a downconversion process.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are microwave photonic links for receiving and processing high frequency radio signals.

Figure 2:
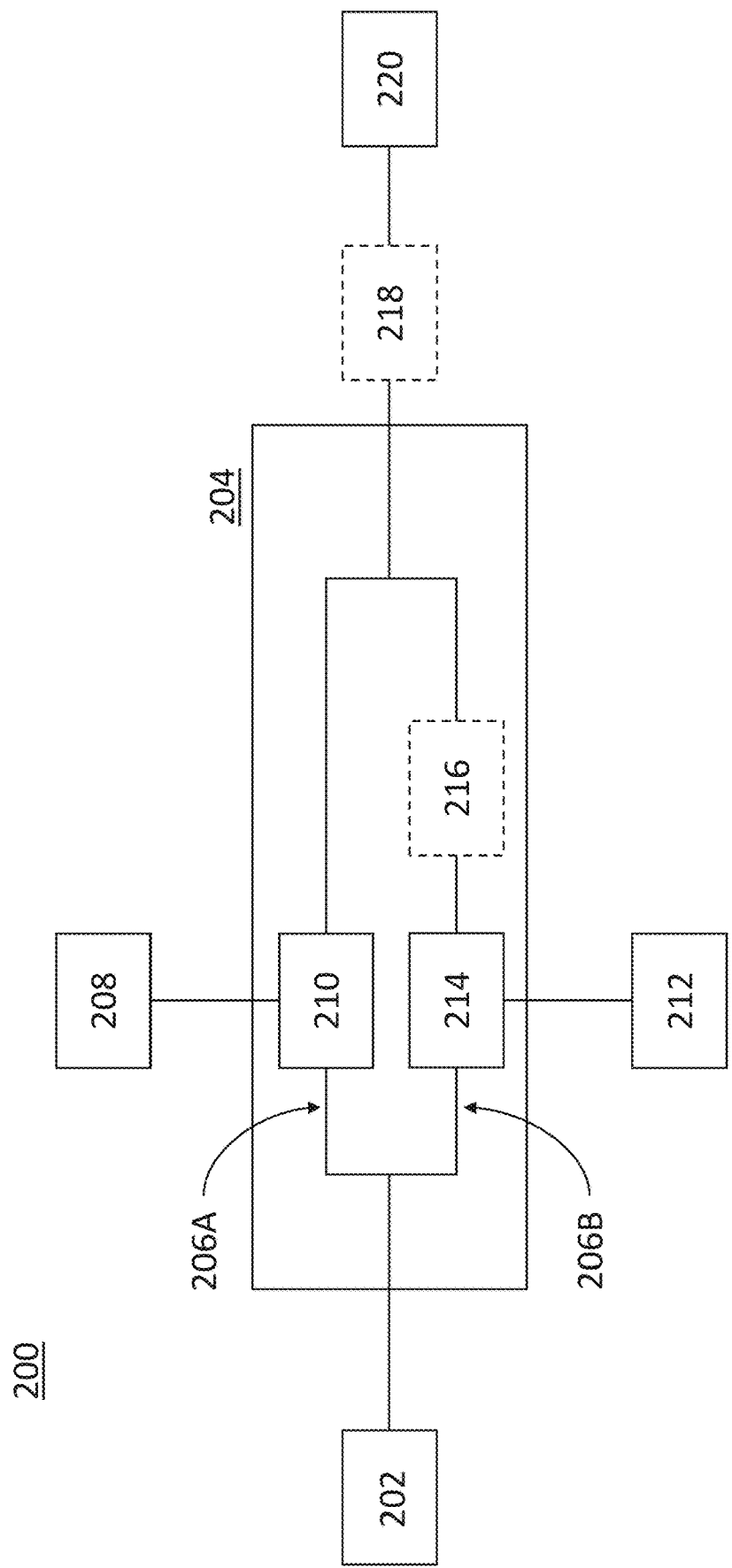
FIG. 2 is an exemplary system for downconverting an input signal according to one embodiment.

FIG. 2 illustrates a receiver system 200 according to one embodiment. System 200 is a continuous-time band-folding microwave photonic link. System 200 receives an optical signal from an optical source 202. The optical signal is provided to a dual-drive Mach-Zehnder modulator (DDMZM) 204. DDMZM 204 includes two optical waveguide arms 206A and 206B through which the optical signal propagates. A first coupler (not shown) receives the input optical signal from the optical source 202 and divides the signal into two optical signals which propagate through arms 206A and 206B, respectively. Arms 206A and 206B are formed from an electro-optic material that can retard the optical carrier phase at the required microwave frequencies. In one embodiment, arms 206A and 206B comprises an electro-optic polymer waveguide. In another embodiment, arms 206A and 206B are formed from lithium niobate $LiNbO_3$. A microwave signal from microwave source 208 is provided to a modulator 210 which applies an electric field to arm 206A in accordance with the received microwave signal. This modifies the refractive index of the optical waveguide material forming arm 204A causing a change in phase of the optical signal travelling through arm 204A. Local tone source 212 provides two local oscillator (LO) tones to modulator 214 which applies an electric field to arm 206B in accordance with the LO tones. The LO tones are continuous single frequency signals. Like with arm 204A above, modulator 214 applies an electric field to arm 206B which modifies the refractive index of the optical waveguide material forming arm 206B resulting in a change in phase of the optical signal travelling through arm 206B. In one embodiment, a DC bias source 216 may be placed downstream of modulator 214 in the optical path. The modulated optical signals from the two arms 206A and 206B are combined in a second coupler (not shown) and provided as an output signal from the DDMZM 204. In one embodiment, the output optical signal from the DDMZM 204 is provided to a bandpass filter 218, before being provided to a photodiode 220. Having described the overall arrangement of system 200, the theory and operation of this arrangement will now be described in greater detail.

Figure 1B:
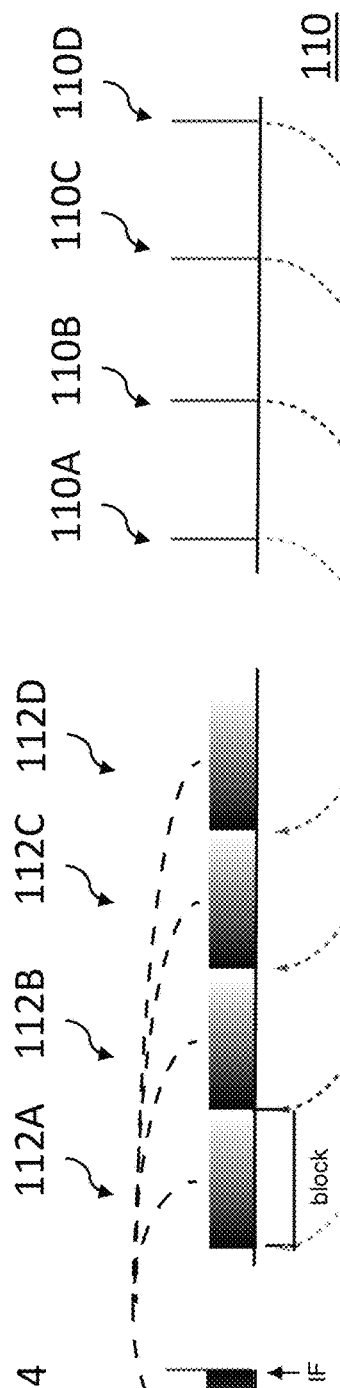
FIG. 1B is a generic illustration of a band compression or folding process.

Returning to the operation of the local tone source 212, one of the advantages of system 200 is that by selecting two appropriate tones an advantageous "mini-comb" may be formed. As described above, a frequency comb is a source whose spectrum consists of discrete frequency lines (see 110 in FIG. 1B). Here, the "mini-comb" is a two-tone phase modulation that leverages their third-order intermodulation products to generate two more evenly-spaced tones within the same band. Intermodulation, as one of ordinary skill will appreciate, refers to the production of frequencies that are sums and differences of the input frequencies and harmonics of the input frequencies. Here, the third-order intermodulation products result in two additional tones, or discrete frequencies, resulting in a four discrete frequency line comb, a.k.a. a four-line comb. The modulation depth of the LO tones produced by source 212 may, in a preferred embodiment, be selected to ensure that the LO tones and the intermodulation products have substantially similar amplitude. This helps to ensure a flat and even conversion gains across the band. The four-line mini-comb is generated separately from the modulation of the optical signal propagating through arm 204B. As discussed above, the modulated optical signals propagating through arms 204A and 204B are added in parallel a second coupler. This prevents the spectrum-of-interest (SOI) from being modulated onto all comb lines and their harmonics and sum and difference frequencies.

As discussed above, system 200 employs a continuous-time approach. The primary reason for this approach is the fact that most digitizers sample the incoming waveform as a built-in part of the processing chain and that step cannot be bypassed. In other words, most digitizers are not designed to receive an already-sampled waveform which only requires digitization. System 200 creates continuous, non-overlapping folds by applying, as LO tones at modulator 214, two equal amplitude microwave tones spaced 2 folded bandwidths (FBW) apart and centered within the spectral band of interested. Thus, the frequency range of the LO tones may be selected based on the desired spectrum of interest. The folded bandwidths are the bandwidth of the digitizer (not shown) or another band that the spectrum of interest is to be compressed into. The LO tones mix and create a phase-modulated spectrum with sum, difference, harmonic, and in-band intermodulation products. The resulting output of modulator 204 is as follows:

Equation 1

$$E(t) = \sqrt{\frac{P_0}{2}}$$
$$e^{j\omega t}\left[\sum_{r=-\infty}^{r=\infty} J_r(m_s)e^{jr\Omega_s t} + e^{j\phi}\sum_{n=-\infty}^{n=\infty} J_n(m_{LO1})e^{jn\Omega_{LO1}t}\sum_{p=-\infty}^{p=\infty} J_p(m_{LO2})e^{jp\Omega_{LO2}t}\right]$$

In Eq. 1, $P_0$ is the optical power input to the modulator 204 (which may be assumed to be equal to the laser launch power), $\omega$ is the optical frequency, $\varphi$ is the static phase difference (if any) between arms 206A and 206B, and subscripted m and $\Omega$ terms are the modulation depths and frequencies of the two LO tones applied to modulator 214 and the spectrum of interest, respectively. In a preferred embodiment, the LO tones haves the same amplitude, thus $m_{LO1} = m_{LO2} = m_{LO}$.

As discussed above, to generate the desired 4 evenly-spaced tones that will allow flat gain across 8 folded bandwidths, the third-order intermodulation products are used. The third-order intermodulation products of the LO tones $(2\nu_1-\nu_2)$ and $(2\nu_2-\nu_1)$ fall above and below the original LO tones with the same frequency spacings as the LOs. Also, as mentioned about, the amplitude of the third-order intermodulation products are set substantially similar to the amplitude as the LO tones. Since the amplitudes of the LO tones are proportional to $J_0(m_{LO})J_1(m_{LO})$ and the third-order amplitudes are proportional to $J_1(m_{LO})J_2(m_{LO})$, by setting $J_0(m_{LO})$ equal to $J_2(m_{LO})$, the intermodulation products will have the same amplitude as the LO tones. This occurs for $m_{LO}$ of approximately 1.84, which is coincidentally close to the maximum amplitude for $J_1$. Under this condition, $J_0(m_{LO})J_1(m_{LO})$ is approximately equal to $J_1(m_{LO})J_2(m_{LO})$, and the product is designated as a L, with a fixed value of approximately 0.184.

As discussed above, the modulated optical signals in arms 206A and 206B are combined and outputted from the DDMZM 204. In one embodiment, the outputted signal is provided directly to photodiode 220. Under a small signal condition where $J_1(m_s) \sim m_s/2$, the output current from the photodiode 220 is given by Equation 2 below:

$$i(t) = \frac{RP_0\alpha}{4}[1 + J_0^4(m_L) \pm 2J_0^2(m_L) + 8L^2 + 4J_1^4(m_L) + \\ 4J_2^2(m_L) + 2Lm_s(\cos(\Omega_{IF}t + \phi) + \cos(\Omega_{IF}t - \phi))]$$

Equation 2

In Equation 2, R is the photodiode responsivity, a is the optical loss of the link, $\Omega_{IF}$ is the frequency difference that falls inside the folded bandwidth between the spectrum of interest and the nearest line of the four comb line, which may be at a higher or lower frequency. The DC components contain contributions from the carrier with the ±term for 0 or π (discussed below), and from the LO tones, the intermodulation products, and second-order sum and difference and harmonic terms. Third order terms, other than the intermodulation products, and fourth-order or higher terms do not contribute significantly to the DC current and can be ignored.

Figure 3:
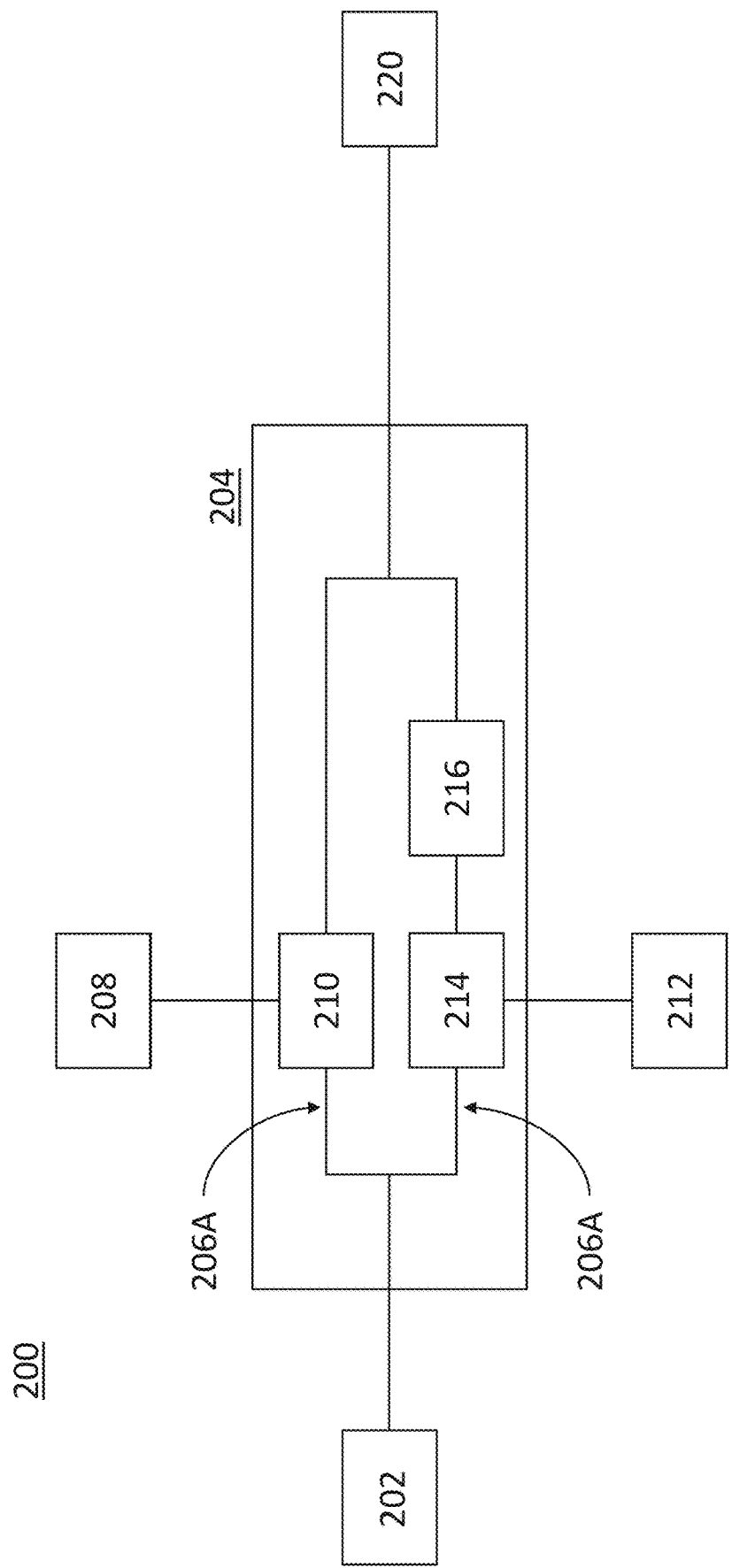
FIG. 3 is another exemplary system for downconverting an input signal according to another embodiment.

In one embodiment, to maximally recover both sidebands and require no optical filtering (i.e., filter 218 is omitted), bias control is used by providing a DC bias source 216, as illustrated in FIG. 3. The static phase bias of bias source 216 is set to 0 or π, which are also known as the "full on" and "null" bias points, respectively. This embodiment will be referred to as the dual-sideband (DSB) configuration. The gain at either bias phase (0 or π) is the same, but the DC photocurrent is different. When biased at "null" and modulated by LO tones to a 1.84 depth, $i_{DC}$, will be reduced by approximately 18% relative to "full on" bias. In a null-biased condition, the $i_{DC}$ is precalculated as approximately $0.49(RP_0\alpha)$.

Figure 4:
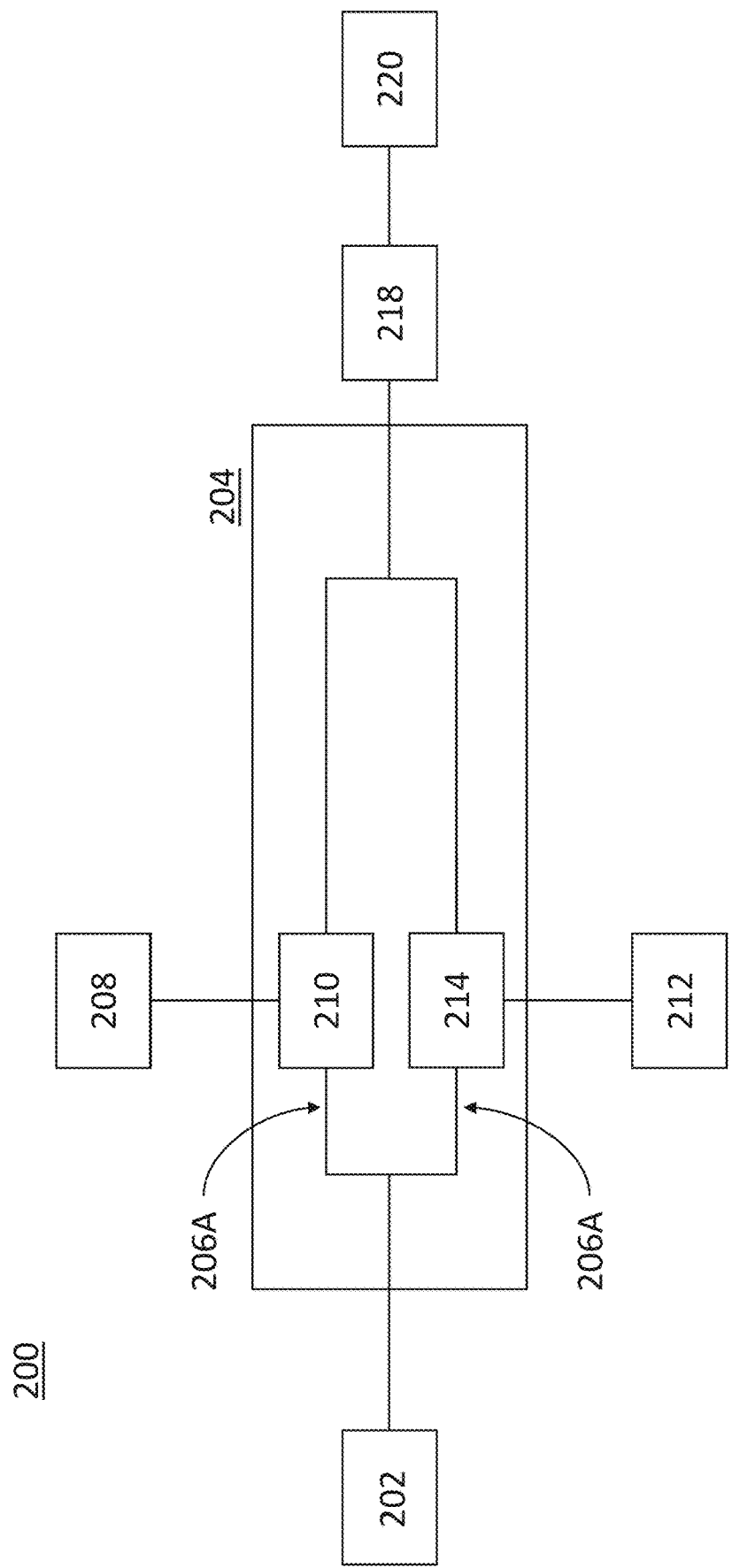
FIG. 4 is another exemplary system for downconverting an input signal according to yet another embodiment.

In another embodiment, a signal recovery method that does not use bias control (i.e., bias source 216 is omitted) may be employed, as illustrated in FIG. 4. Specifically, an optical bandpass filter 218 is used to isolate one spectrum of interest region and prevent signal fading as the relative optical phase with the other sideband inevitably varies over time. This embodiment will be referred to as a single-sideband (SSB) embodiment. One advantage of the SSB embodiment is that filter 218 filters out all out-of-band spectral products that would add to the DC photocurrent and could saturate the photodetector and fold in excess noise. One disadvantage of the SSB embodiment is that there is a lower limit to the original frequencies that can be recovered depending on the bandpass-filter's width and sharpness. In a case where filter 218 is used to detect a single sideband, the output current of the photodiode is given by Equation 3 below, and has a DC value of approximately $0.034(RP_0\alpha)$:

$$i(t) = \frac{RP_0\alpha}{4}[4L^2 + Lm_s\cos(\Omega_{IF}t)]$$

Equation 3

Having described the structure of system 200 and its theory of operation, attention will now be directed to the radiofrequency performance metrics of system 200. From Equation 2, the small-signal RF conversion gain for system 200 is given by Equation 4 below:

$$G_{RF} = (RP_0\alpha)^2 \left(\frac{L\pi R_1 R_0}{2V_\pi^2}\right)^2$$

Equation 4

In Equation 4, $R_1$ and $R_0$ are the generator and load resistances, respectively, seen by the DDMZM 204 and the photodiode 212, $V_\pi$ is the half-wave switching voltage of the DDMZM 204. Since $V_\pi$ is a frequency dependent parameter, it is assumed that $V_\pi$ does not change significantly over the fractional bandwidth being modulated by the spectrum of interest. Since the amplitude parameter L has a fixed value of approximately 0.184, the conversion gain may be considered to be low. For example, in the SSB embodiment, half of the signal is recovered and the gain is further reduced by a factor of 4.

With respect to noise, the noise figure (NF) for the DSB will vary with the bias point. If there is no filtering in place (as in FIG. 3), all the optical power spread across all the modulation products reaches the photodiode, minus any fractional carrier cancellation. The shot-noise limited noise figure for the null-biased DSB case with no filtering is given by Equation 5 below:

$$NF_{DSB,shot} = \frac{2q\langle i_{dc}\rangle R_0}{G_{RF}kT} \cong \frac{115qV_x^2}{(RP_0\alpha)\pi^2 R_i}$$

Equation 5

In Equation 5, q is the fundamental charge, k is Boltzmann's constant, and T is the absolute temperature in degrees Kelvin.

The noise function for the DSB configuration can be improved, in another embodiment, by employing a complex double bandpass filter to recover both sidebands and remove all unneeded spectral features. In yet a further embodiment, a notch filter (e.g., a fiber bragg grating (FBG) in a transmission mode) may be used to remove the carrier and large close-in difference frequencies; however, the outlying harmonic and sum frequencies will still contribute to $i_{dc}$. In an SSB embodiment, the only DC current is from the four unfiltered comb lines. This results in an $i_{dc}$ values less than 10% of the DSB case.

In another embodiment, system 200 includes an Erbium-doped fiber amplifier (EDFA) that may be placed either (i) immediately after source 202 or (ii) immediately before the photodiode 220 in the optical path. The EDFA may be placed in either of these locations in an embodiment where the bias source 216 is used or in an embodiment where the bandpass filter 218 is used. In the case where the optical gain of the EDFA is much less than 1 and the EDFA is placed immediately after source 200, the noise function for a signal spontaneous noise (ssp) limited null-biased DSB system 200 is given by Equation 6 below:

$$NF_{DSB,ssp} = \frac{\langle i_{dc}\rangle^2 R_0}{G_{RF}kT}\frac{2h\nu NF_A}{P_{input}} \cong \frac{57h\nu NF_A q V_\pi^2}{(P_0)\pi^2 R_i kT} \quad \text{Equation 6}$$

In Equation 6, $NF_A$ is the optical noise figure of the EDFA, h is Planck's constant, ν is the optical frequency (e.g., 193.5 THz).

If the EDFA, however, is placed immediately before photodiode 220, then the optical input power to the EDFA is reduced by the modulation and link attenuation and the noise function is given by Equation 7 below:

$$NF_{DSB,ssp} \cong \frac{116}{\alpha}\frac{h\nu NF_A V_\pi^2}{P_0 \pi^2 R_i kT} \quad \text{Equation 7}$$

The SSB noise function is significantly different from the DSB noise function because the $i_{dc}$ is much smaller and the EDFA noise itself is proportional to $i_{dc}^2$. For the same launch power and link, the SSB noise function is 17 dB better for an EDFA before the modulator and 5.5 dB better when the EDFA is before the detector, than the DSB noise function.

Having described the structure of system 200, the theory behind the operation of system 200, and its performance metrics, attention will now directed to some exemplary configurations.

In a first exemplary configuration, system 200 included a DDMZM 204 with a 4.5 dB optical insertion loss and ~5V single drive Vπ at 1550 nm and 12 GHz was illuminated by a shot-noise limited laser (above 100 MHz) acting as the optical source 202. The photodiode 220 was a 20 GHz bandwidth diode with R=0.8 A/W, linear power handling up to at least 20 mA and an internal 50-Ohm load matching resistor in parallel with the output. LO tones at 13 GHz and 14 GHz were set to m~1.84 and the tones and their intermodulation tones were verified to be the same amplitude on a high-resolution optical spectrum analyzer. With this configuration, the DSB configuration was examined. The maximum photocurrent was 16.2 mA and the minimum was 13.1 mA, which agrees with Equation 2. With 13.1 mA current, a small signal at 13200 MHz was provided from source 208 to modulator 210 and modulated onto the optical signal in arm 206A. A 200 MHz intermediate frequency had a −21.5 dB gain after accounting for the load-matching resistor, which agrees with the −21.8 dB calculation from Equation 4. The LOs were changed to 14 GHz and 15 GHz and the same small signal was recovered again with −21.5 dB gain. In the first instance, the intermediate frequency was the beat between the signal and the 13 GHz tone. In the second instance, the intermediate frequency was beating with the 12 GHz intermodulation product, showing that both the original LO and the intermodulation products acted to downconvert the signal.

To test the SSB configuration, a waveshaper configured as the bandpass filter 218 was used. No change in $i_{dc}$ or gain was measured when the bias was changed to any value. The same gain measurement as for the DSB configuration was repeated and measured −38 dB which agreed with the −37.9 dB calculated for 0.3 mA of photocurrent. Since this amount of photocurrent would not place system 200 in the shot-noise limited regime, an EDFA was added before the photodiode 220, and the received photocurrent was set to 10 mA. In this case, the gain agreed with the predicted value of −7.5 dB.

With respect to noise, the measured noise floors matched the expected values for amplified thermal noise from source 212 after all noise sources, link gain, and folding from all spectral lines were considered. As expected for a situation where the input is noise limited, the measured noise floors along with the previously measured gain indicated that the noise functions were constant, whether the system 200 was amplified by the EDFA or not. System 200 in DSB and SSB configurations had different noise functions, but they remained the same for all photocurrent with and without and EDFA. In the amplified SSB case, the measured noise power spectral density with 10 mA $i_{dc}$ was −132.5 dBm/Hz, for a 49.5 dB noise function. The $3^{rd}$-order spur free dynamic range (SFDR) was 98 db/Hz$^{2/3}$. The unamplified SSB PSD with 0.4 mA was −159.5 dBm/Hz working out to the same NF and SFDR.

To demonstrate folding across several folded bandwidths, a group of representative data signals was generated across a spectrum of interest, populating several folded bandwidths between 11500-15500 MHz and downconverted all at once to the 0-500 MHz bandwidth. The signal types, bandwidths, native frequencies, converted frequencies, and input and output SNRs and EVMs are shown below in

TABLE 1

| Native RF (MHz) | Final IF (MHz) | Signal Type | Native SNR (dB) | Native EVM (−dB) | Final SNR (dB) | Final EVM (−dB) |
|---|---|---|---|---|---|---|
| 12250 | 250 | 16QAM, 10 MS/s | 25 | 24.5 | 17 | 17 |
| 12950 | 50 | 16QAM, 10 MS/s | 36 | 35 | 28 | 28 |
| 13900 | 200 | 64QAM, 24 MS/s | 32 | 31.5 | 23 | 23 |
| 13800 | 400 | 16QAM, 20 MS/s | 31 | 30.8 | 25 | 24 |
| 14710 | 290 | QPSK, 10 MS/s | 29 | 29 | 23 | 23 |
| 15490 | 10 | QPSK, 10 MS/s | 15 | 15.5 | 7 | — |

In conclusion, described herein is a system 200 that downconverts an entire desired spectral band of interest to a single folded bandwidth. System 200 provides several options with which to optimize different parameters and is less complex than previous folding links, yet stills enables one to translate and fold a reasonably wide bandwidth for various purposes. In a preferred embodiment, the resulting intermediate frequency can be sampled by existing digitizers to produce a digital signal.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus for downconverting a high frequency band to a lower frequency band, comprising:
   an optical source constructed to output a continuous wavelength optical signal; and
   a dual-drive mach zehnder modulator that includes:
      a first arm formed from a first optical waveguide and constructed to receive the optical signal from the optical source,
      a second arm formed from a second optical waveguide and constructed to receive the optical signal from the optical source,
      a first modulator constructed to receive an input signal from a first source and modulate the input signal onto the optical signal received from the optical source and propagating through the first arm to form a first modulated optical signal, and
      a second modulator constructed to receive a plurality of local oscillator tones from a local oscillator source and modulate the plurality of local oscillator tones onto the optical signal received from the optical source and propagating through the second arm to form a second modulated optical signal,
      wherein the second modulator is further constructed to modulate third-order intermodulation products of the plurality of local oscillator tones onto the optical signal propagating through the second arm,
      wherein the dual-drive mach zehnder modulator is constructed to output an output signal which is a combination of the first modulated optical signal and the second modulated optical signal, and
      wherein the input signal from the first source is different from the plurality of local oscillator tones from the local oscillator source.

2. The apparatus of claim 1, further comprising:
   a photodiode constructed to receive the output signal from the dual-drive mach zehnder modulator and generate an electrical signal.

3. The apparatus of claim 1, wherein the dual-drive mach zehnder modulator further includes a DC bias source disposed in the second arm.

4. The apparatus of claim 1, further comprising:
   a photodiode constructed to generate an electrical signal; and
   a bandpass filter constructed to receive the output signal from the dual-drive mach zehnder modulator and provide a filtered signal to the photodiode, wherein the photodiode generates the electrical signal based on the filtered signal.

5. The apparatus of claim 1, wherein the first arm and the second arm comprise an electro-optic material that retards an optical carrier phase at a microwave frequency.

6. The apparatus of claim 1, wherein the first arm and the second arm comprise an electro-optic polymer waveguide.

7. The apparatus of claim 1, wherein the first arm and the second arm comprise lithium niobate.

8. The apparatus of claim 1, wherein the first modulator is constructed to modulate the input signal onto the optical signal received from the optical source and propagating through the first arm by applying an electric field to the first arm that modifies a refractive index of an optical waveguide material forming the first arm.

9. The apparatus of claim 1, wherein the second modulator is constructed to modulate the plurality of local oscillator tones and the third-order intermodulation products onto the optical signal received from the optical source and propagating through the second arm by applying an electric field to the second arm which modifies a refractive index of an optical waveguide material forming the second arm.

10. The apparatus of claim 1, wherein a number of the plurality of local oscillator tones is two, and a number of the third-order intermodulation products is two.

11. The apparatus of claim 1, wherein the plurality of local oscillator tones are spaced two folded bandwidths apart.

12. The apparatus of claim 1, wherein one of the third-order intermodulation products has a higher frequency than the plurality of local oscillator tones and another of the third-order intermodulation products has a lower frequency than the plurality of local oscillator tones.

13. The apparatus of claim 1, wherein the plurality of local oscillator tones and the third-order intermodulation products are evenly-spaced in frequency.

14. A method of downconverting a high frequency band to a low frequency band, comprising the steps of:
    receiving, at a dual-drive mach zehnder modulator, a continuous wavelength optical signal from an optical source, an input signal from a first source, and a plurality of local oscillator tones from a local oscillator source,
    wherein the dual-drive mach zehnder modulator includes:
       a first arm formed from a first optical waveguide and constructed to receive the optical signal from the optical source,
       a second arm formed from a second optical waveguide and constructed to receive the optical signal from the optical source,
       a first modulator constructed to receive the input signal from the first source, and
       a second modulator constructed to receive the plurality of local oscillator tones;
    modulating the input signal onto the optical signal received from the optical source and propagating through the first arm to form a first modulated optical signal;
    modulating the plurality of local oscillator tones and third-order intermodulation products of the plurality of local oscillator tones onto the optical signal received from the optical source and propagating through the second arm to form a second modulated optical signal; and
    combining the first modulated optical signal and the second modulated optical signal to form an output optical signal,
    wherein the input signal from the first source is different from the plurality of local oscillator tones from the local oscillator source.

15. The method of claim 14, further comprising:
    outputting the output optical signal to a photodiode constructed to generate an electrical signal.

16. The method of claim 14, further comprising:
    outputting the output optical signal to a bandpass filter;
    filtering the output optical signal at the bandpass filter to form a filter signal; and
    providing the filtered signal to a photodiode to generate an electrical signal.

17. The method of claim 14, wherein the input signal from the first source is a microwave signal that includes a spectrum of interest, and the plurality of local oscillator tones are spaced two folded bandwidths apart and centered within the spectrum of interest.

18. The method of claim 17, wherein a folded bandwidth is a bandwidth of digitizer constructed to receive an electrical signal generated from the output signal.

* * * * *